United States Patent [19]

Sigyo et al.

[11] Patent Number: 4,609,611
[45] Date of Patent: Sep. 2, 1986

[54] LIGHT INFORMATION RECORDING MEDIUM

[75] Inventors: Masamiti Sigyo; Minoru Wada; Yonosuke Takahashi, all of Shizuoka, Japan

[73] Assignee: Fuji Photo Film Co., Ltd., Kanagawa, Japan

[21] Appl. No.: 668,779

[22] Filed: Nov. 6, 1984

[30] Foreign Application Priority Data

Nov. 7, 1983 [JP] Japan .................. 58-208564

[51] Int. Cl.$^4$ .................................................. G03C 1/00
[52] U.S. Cl. ...................................... 430/270; 430/945; 346/135.1; 369/284; 369/286; 369/288; 428/65; 428/64
[58] Field of Search .................. 428/64, 65; 369/284, 369/286, 288; 346/135.1; 430/270, 945

[56] References Cited

U.S. PATENT DOCUMENTS 4,383,029  5/1983  Yamada et al. ................ 430/542 X Primary Examiner—Alexander S. Thomas
Attorney, Agent, or Firm—Sughrue, Mion, Zinn, Macpeak and Seas

[57] ABSTRACT

A light information recording medium useful for light disc memories is described, comprising a support and a recording layer formed thereon containing a mixture of a metal with at least one of $Ga_2S_3$ and $MoO_3$.

11 Claims, 2 Drawing Figures

LIGHT INFORMATION RECORDING MEDIUM

FIELD OF THE INVENTION

This invention relates to a light information recording medium for recording information using a light beam of high energy density.

BACKGROUND OF THE INVENTION

Known recording materials for recording information using a light beam of high energy density, such as laser, include thermal recording materials in addition to light sensitive materials using silver salts.

In the thermal recording material, the recording layer has a high optical density and absorbs an irradiated light beam of high energy density causing a local temperature increase which causes thermal deformation such as melting, evaporation and aggregation. Accordingly, the irradiated portions are removed and change in optical character such as by forming a difference in optical density from the unirradiated portions whereby the light information is recorded. Such a thermal recording medium is desirable because the recording material does not need processings such as development and fixing. Further, use of such a recording material does not require work in a dark room since it is not sensitive to ordinary room light. In addition, the recording material provides an image having a high contrast, and it is possible to add information to the recording material.

In general, such a thermal recording material is frequently recorded by converting information to be recorded into electric time series signals and scanning the recording material with a laser beam the intensity of which is modulated according to the signals. This method is desirable because recorded images are obtained at real time.

Since thermal recording material has the unique features as described above, the application of the recording material to various uses such as, for example, substitution for lithographic printing films, facsimile recording materials, photomasks for integrated circuit (IC), microfilms, etc., has been attempted and a part of these applications are now used in practice. Because of having various uses and applications, such recording materials have been actively developed and investigated by many technical organs and various materials such as metals, plastics, dyes, etc., have been proposed as the materials for the recording layers. These materials are practically described in, for example, M. L. Levene et al., *Electron Ion and Laser Beam Technology*, the record of the 11th Symposium (1969), *Electronics*, page 50 Mar. 18, 1968); D. Maydan, *The Bell System Technical Journal*, Vol. 50, page 1761 (1971); C. O. Carlson, *Science*, Vol. 154, page 1550 (1966), U.S. Pat. Nos. 4,188,214, 4,291,119, 4,216,501, 4,233,626 and 4,188,214, and British Patent No. 2,026,346.

In these known techniques, it can be said that every effort has been made to improve the recording sensitivity of the recording materials. Efforts made toward improving the sensitivity of recording materials when using thin metal layers are summarized below.

Recording materials using a thin layer of a metal such as Bi, Sn, In, Al, Cr, etc., have excellent properties such as high resolving power and high contrast. However, many of these recording materials have a light reflectance to laser light of higher than 50% and thus the energy of laser light cannot be effectively utilized by these recording materials. Therefore, the light energy required for recording is large and a laser light source of a high output power is required for recording highspeed scanning, thereby the recording device becomes larger and expensive.

Accordingly, various recording materials having a high recording sensitivity have been investigated. For example, U.S. Pat. No. 3,560,994 describes a recording layer composed of Se, Bi and Ge layers. In this case, the layer of Ge reduces the light reflectance of the layer of Bi to irradiated light, and also the layer of Se is an easily evaporating layer and accelerates the the thermal deformation of the Bi layer which is the main recording layer, and the resulting recording layer can record a light information with less energy than when a layer of Bi is used alone. Furthermore, a layer for reducing or preventing light reflection is described in U.S. Pat. Nos. 4,335,198 and 3,665,483. Also, a layer for reducing the thermal conductivity provided between a recording layer and a support is described in Japanese Patent Application (OPI) No. 12,637/'75 and U.S. Pat. No. 3,911,444. Furthermore, a recording layer composed of a certain kind of metal sulfide, metal fluoride, or metal oxide and a metal as a mixture thereof or as a double layer of them is described in U.S. Pat. Nos. 4,188,214 and 4,415,650. Still further, a recording layer composed of a mixture of an inorganic material and an organic material is also disclosed in Japanese Patent Application (OPI) No. 5742/'79.

As summarized above, various efforts have been made with respect to high sensitization alone and some of such recording materials have been improved to the stage of practical usefulness. The systems which use these recording materials and the circumferential techniques thereof have also progressed in regard to not only the recording materials used for new applications but also the recording materials used for the foregoing conventional purposes. Better properties continue to be required for both new and old applications. In particular, when using a thermal recording material for a new application, such as an optical disc memory, the requirement for better properties is very strong and it is substantially difficult to meet these requirements using conventional recording materials as described above.

The main properties of recording materials required for an optical disc memory are as follows:

(1) the recording material has a high sensitivity enabling high-speed data writing, (2) reflection reading or information is preferred for simplifying the optical system and thus the recording layer must have a high light reflectance for realizing the above requirement.

(3) the recording material has chemical stability capable of stably retaining the recorded information for a long period of time (i.e., archival property of at least 10 years), (4) the recording material has a high resolving power capable of making high density recording, (5) the recording material gives recorded bits of good form for increasing the S/N ratio at reading (for the purpose, lack of uniformity in granularity of recording layer, etc., is undesirable), (6) the recording material is excellent in production aptitude (for example, the evaporation speed during vapor deposition is stable, and also decomposition, etc., do not occur during vapor deposition), and (7) materials used for the recording material are nontoxic.

Many other properties are also desired or required for such recording materials in addition to the foregoing properties which are not listed above. In the foregoing properties, the property (1), i.e., the high sensitivity generally conflicts with the property (2), the high reflectance. Also, it is generally difficult to satisfy the properties such as preservability, nontoxicity, etc., using materials having a relatively high sensitivity, such as a thin Te layer. Also, for high sensitivity, a low-melting metal such as In, Sn, etc., is considered to be preferred but in the case of a one component thin layer of such a metal, the thin layer is liable to take a island-like structure and hence it is difficult to satisfy the property (5) with such a material.

As described above, the materials used for optical disc memory are required to have the very best possible properties and in fact, materials simultaneously satisfying such properties as high sensitivity, long preservability and nontoxicity have not yet been discovered.

Thermal recording materials having a recording layer composed of a metal and a non-metallic material (metal sulfides, metal fluorides or metal oxides) formed by simultaneous vapor deposition of the materials (as disclosed in U.S. Pat. Nos. 4,188,214, etc.) have considerably improved properties with respect to (1) to (7) above. However, such a recording layer is not yet capable of exhibiting fully satisfactory properties. Materials capable of fully satisfying the requirements of both high sensitivity and storage stability remain to be found. Japanese Patent Application (OPI) No. 124134/81 discloses an optical recording medium for use in optical disk memories, obtained by simultaneous deposition of In and $SiO_2$ having high chemical stability on a substrate such that $SiO_2$ is deposited in an amount of 40 to 60% by volume of the resultant deposited mixture. This recording medium, however, still has the disadvantage that the energy of the laser beam to be used for the recording is not sufficiently low and the speed of the recording is not sufficiently high.

SUMMARY OF THE INVENTION

An object of this invention is to provide, for use in optical disk memories, a recording medium having excellent properties with respect to recording sensitivity, particularly to the laser beam, storage stability, resolving power and S/N ratio in data reading, among other various properties expected of optical disks, and being available at low cost.

As a results of extensive investigation of a recording medium having excellent sensitivity, storage stability and resolving power, the inventors have found that at least one of $Ga_2S_3$ and $MoO_3$ exhibit advantageous properties when used with a metal as admixture for the recording layer. This invention has been achieved by the discovery.

This invention relates to a light information recording medium capable of recording an information by way of thermal deformation or evaporation of a recording layer upon irradiation of laser light, which comprises a substrate having deposited thereon a recording layer formed of a mixture of a metal with at least one of $Ga_2S_3$ and $MoO_3$ (hereafter referred to as the "Metal compound").

DETAILED DESCRIPTION OF THE INVENTION

Figure 1:
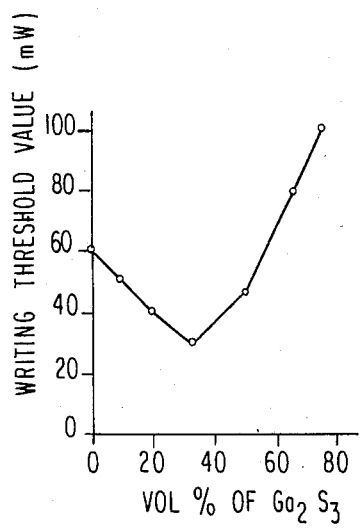
FIGS. 1 and 2 are graphs illustrating the relation between the threshold value for recording and the percentage composition of the layers of mixtures of In with $Ga_2S_3$ and with $MoO_3$ in Examples 1 and 2, respectively.

Any substrates which are general by used in thermal recording materials may be used for the light information recording medium of this invention. Examples of the substrates include plastics such as polymethyl methacrylate and copolymers thereof, polycarbonate and polyethylene terephthalate, glass, and plates or foils of varying metals.

Examples of the metal which is used in the recording layer of this invention include Mg, Sc, Y, Ti, Zr, Hf, V, Nb, Ta, Cr, Mo, W, Mn, Re, Fe, Co, Ni, Rh, Pd, Ir, Pt, Cu, Ag, Au, Zn, Cd, Al, Ga, In, Si, Ge, Sn, As, Sb, Bi, Se and Te. These metals may be used singly, in combination thereof, or in the form of alloys. Of these, Mg, Zn, Al, In, Bi and Sn are preferably used because of their lower melting points. To satisfy the requirement of (3), among other requirements for the aforementioned optical disk memory, the metal is desired to be minimally soluble in water and minimally oxidizable. To satisfy the requirement of (1), the metal is desired to be capable of forming a film of as small a thickness as possible, to have a large capacity for the absorption of light, and to be readily melted by the absorption of laser beam. From the these viewpoints, In which has a low melting point (157° C.) and is minimally oxidizable is most preferably used.

In this invention, $Ga_2S_3$ and/or $MoO_3$ are mixed with the aforementioned metal to form a recording layer. $MoO_3$ is particularly preferred when used in combination with Sn and/or In because the resulting recording layer has high sensitivity and low percent decrease in optical density with a passage of time. The use of $Ga_2S_3$ is more preferred as the metal compound to be mixed with metal because (1) the resulting recording layer has less percent decrease in optical density with a passage of time, (2) bits formed in the recording layer upon recording have sharp edges resulting in high S/N ratio and (3) errors in the formation of bits are minimized.

The amount of the metal compound in the recording layer is preferably within the range of 10 to 50% by volume based on the total volume of the metal compound and the metal. The recording sensitivity is markedly improved within this range. As will be noted from Examples described later, the sensitivity is markedly improved when the amount falls in the range of 20 to 40% by volume. If it is less than 10%, the interface between the redording layer and the substrate is liable to become so opaque as to lower the S/N ratio during reproduction.

Although the thickness of the recording layer varies depending upon the materials of the layer to be used, it is preferably within the range of 100 Å to 2,000 Å and preferably 200 Å A to 600 Å. If the thickness is below 100 Å, the percent absorption of light decreases and the sensitivity decreases. If it is more than 2,000 Å, the sensitivity and the resolving power are both lowered.

One method of forming the recording layer in the recording medium of this invention may comprise preparing a vacuum vessel incorporating therein two evaporation sources, namely a resistance heating device for the metal and an electron gun for the metal compound and, by the use of this vacuum vessel, effecting simultaneous vapor deposition of the metal and the metal compound on a given substrate. The mixing ratio of these two materials can be effected by providing the evaporation sources each with a quartz oscillation type film thickness monitor and, by means of the monitors, controlling the speeds of evaporation of the two materials. Any other known film forming methods such as the spattering method and the ion-plating method may also be adopted.

In order to further improve the sensitivity of the recording layer of this invention and improve the adhesion between the recording layer and a substrate, a proper interlayer may be formed between the recording layer and the substrate by coating, vapor-deposition, etc. Example of preferred materials used for such an interlayer include halogenated polyolefin, halogenated polyhydroxystyrene, chlorinated rubber, nitrocellulose, etc., as well as a non-metallic inorganic material such as SiO and $SiO_2$. The proper thickness of the interlayer is from 0.05 to 5 $\mu$m and preferably from 0.2 to 30 $\mu$m.

In the recording material of this invention, a protective layer composed of an inorganic material or an organic material may be formed on the foregoing recording layer formed on a substrate. The formation of a protective layer on the recording layer is effective for improving durability of the recording material, the mechanical strength of the recording material, the shelf life of the recording material, etc. The formation of such a protective layer is, as a matter of course, one of the preferred embodiments of this invention.

As the protective layer, an inorganic material or an organic material may be used as described above. The material is required to have good permeability with respect to a light beam having high energy used for recording and reading, have high mechanical strength, have less reactivity with the recording layer, have good coating properties, and easily form the protective layer.

Preferred examples of the inorganic materials used for making the protective layer of this invention are transparent inorganic materials such as $Al_2O_3$, $SiO_2$, SiO, MgO, ZnO, $TiO_2$, $ZrO_2$, $MgF_2$ and $CuF_2$. The protective layer of the inorganic material may be formed by vacuum deposition, sputtering, ion plating, etc.

It is also preferred to use organic materials for the protective layer. Examples of useful organic materials used for such a protective layer include various resins or polymers such as styrenic resins, e.g., polystyrene, styrene-maleic anhydride resin, etc.; vinylic resins, e.g., polyvinyl acetate, polyvinyl alcohol, polyvinyl butyral, polyvinyl formal, etc.; methacrylic acid ester series resins, e.g., isobutyl polymethacrylate, methyl polymethacrylate, etc.; amide series resins, e.g., polydiacetonacrylamide, polyacrylamide, etc.; cellulose series resins, e.g., ethyl cellulose, cellulose acetate lactate, cellulose nitrate, diacetyl cellulose, etc.; halogenated polyolefins, e.g., polyvinyl chloride, chlorinated polyethylene, etc.; phenol resins; soluble polyesters; soluble nylons; gelatin; etc., and copolymers of them. These resins are dissolved in various solvents and may be coated as the solution thereof by a known coating method.

Various kinds of solvents can be used for the foregoing purpose. Examples of the solvents include acetone, methyl ethyl ketone, methyl isobutyl ketone, methyl cellosolve, ethyl cellosolve, butyl cellosolve, methyl cellosolve acetate, ethyl cellosolve acetate, butyl cellosolve acetate, hexane, cyclohexane, ethylene chloride, methylene chloride, benzene, chlorobenzene, methanol, ethanol, butanol, petroleum ether, dimethylformamide and thinner. The solvent is selectively used according to the resin used for the protective layer.

The resins described above may contain pigments, matting agents, plasticizers, lubricants, etc., according to the purpose of the protective layer, and in particular, the addition of 0.1 to 1.0% by weight of higher fatty acid having not less than 11 carbon atoms or an acid amide thereof is effective for improving the surface strength of the recording material. The higher fatty acid or acid amide may also be coated on the protective layer to a thickness of 0.001 to 1 $\mu$m in an ordinary manner.

The optimum thickness of the protective layer used in this invention may be selected according to the layer strength, shelf life, recording sensitivity, etc., required for the recording material. However, it is particularly preferably for the layer to have a thickness of 0.01 to 500 $\mu$m.

The most desirable method of laser recording and laser reading of data for the purpose of this invention involves allowing both recording and reading of data to be effected by causing the incident laser beam to reach the recording layer from the substrate side. According to the method good S/N ratio is obtained since the interface between the substrate and the vacuum deposited layer has no granularity, whereas the surface of the recording layer more or less has granularity.

This method of writing and recording through the substrate-side of the medium is particularly suitable with a recording medium having a structure as disclosed, for example, in U.S. Pat. No. 4,074,282, specifically one prepared by fixing two substrates each having a recording layer, with the recording layers facing each other, and a seal interposed between them to provide an air gap between the recording layers (so-called air sandwich type). Various advantages, such as recordability on both surfaces, can be imparted to such a recording medium. Such a structure of light information recording medium is also preferred since a protective layer may be omitted to be formed on the recording layer.

The recording material of the present invention is most suitable for optical disk memories as described above. However, this invention is not limited to this use and can be used as substitute for lithographic printing films, as a facsimile recording materials, IC photomasks, microfilms, etc.

The present invention will be specifically described below with reference to working examples. However, the scope of the invention is not limited to these examples.

EXAMPLE 1

In and $Ga_2S_3$ were simultaneously vapor-deposited from resistance-heating evaporation sources under a vacuum of $5\times10^{-5}$ torr on to a polyethylene terephthalate support having a thickness of 100 $\mu$m to form a recording layer having a thickness of 600 Å. In this manner, various samples were prepared by changing the ratio of In and $Ga_2S_3$. The mixing ratio of the two was controlled by providing crystal oscillating-type film thickness monitors for the respective evaporation sources, and appropriately adjusting the speeds of vapor deposition.

Ar laser beams having a beam diameter of 1 to 2 $\mu$m were irradiated in a stationary condition onto these samples for 100 nsec, and the writing threshold values of the recording materials were compared. (The threshold value is a minimum laser power to form bits by way of thermal deformation or evaporation of laser-irradiated parts of the recording layer.) As a result, when the proportion of $Ga_2S_3$ was in the range of from 10 to 50% by volume, the writing threshold value was low and therefore the recording sensitivity was good (FIG. 1).

The sample which contained 33% by volume of $Ga_2S_3$ was used as a sample of Example 1 for comparison with Comparative Examples 1, 2 and 3.

EXAMPLE 2

Figure 2:
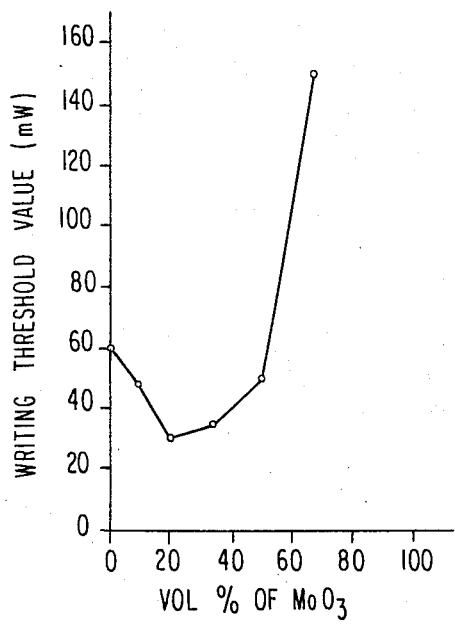

Samples were prepared in the same way as in Example 1 by varying the ratio of In and $MoO_3$ while adjusting the thickness of the recording layer to 600 Å, and the laser recording sensitivities of the samples were compared as in Example 1. It was found that when the proportion of $MoO_3$ was in the range of 10 to 50% by volume, a good recording sensitivity was obtained (FIG. 2).

A sample containing 33% by volume of $MoO_3$ was used as a sample of Example 2 for comparison with Comparative Examples.

COMPARATIVE EXAMPLES 1-3

For comparison with the present invention, recording materials were prepared using a mixture of Sn and SnS, a mixture of In and MoO, and a mixture of In and GeO, disclosed in U.S. Pat. No. 4,188,214 (film thickness 600 Å; the content of the compound was 33% by volume). These were used respectively as samples of Comparative Examples 1, 2 and 3.

COMPARATIVE EXAMPLE 4

A recording material having a layer of a mixture of In and $SiO_2$ (thickness 1,000 Å; 50% by volume of $SiO_2$) was prepared in accordance with Japanese Patent Application (OPI) No. 12413/1981. The material was used as a sample of Comparative Example 4.

The recording sensitivities (writing threshold values) by laser and the optical densities (initial and after storage for 10 days at 60° C. and 90% RH) of these samples were measured. The optical densities were measured by using a Macbeth densitometer, Model TD-504. The results are shown in Table 1. These results demonstrate that the recording media of the invention require a lower minimum energy than the comparative recording media, and the percent decrease in optical density was smaller in the recording media of the invention.

TABLE 1

| Sample | Recording layer | Recording sensitivity (mW) | Optical density | | Percent decrease in density (%) |
|---|---|---|---|---|---|
| | | | Initial | After storage test | |
| Ex. 1 | In + $Ga_2S_3$ | 30 | 1.14 | 1.04 | 8.8 |
| Ex. 2 | In + $MoO_3$ | 30 | 1.25 | 1.05 | 16.0 |
| CEx. 1 | Sn + SnS | 60 | 1.15 | 0.60 | 47.8 |
| CEx. 2 | In + MoO | 50 | 1.25 | 0.95 | 24.0 |
| CEx. 3 | In + GeO | 40 | 1.64 | 0.65 | 60.4 |
| CEx. 4 | In + $SiO_2$ | 75 | 1.14 | 0.95 | 16.7 |

While the invention has been described in detail and with reference to specific embodiments thereof, it will be apparent to one skilled in the art that various changes and modifications can be made therein without departing from the spirit and scope thereof.

What is claimed is:

1. A light information recording medium comprising a substrate having formed thereon a recording layer capable of recording an information by thermal deformation thereof upon irradiation with a laser beam said recording layer consisting essentially of a mixture of a metal with at least one metal compound selected from the group consisting of $Ga_2S_3$ and $MoO_3$ wherein the recording layer contains the metal compound in a proportion of from 10 to 50% by volume.

2. A recording medium as in claim 1, wherein the recording layer has a thickness of from 100 Å to 2,000 Å.

3. A recording medium as in claim 1, further comprising a protective layer formed on the recording layer.

4. A recording medium as in claim 1, further comprising a interlayer formed between the substrate and the recording layer.

5. A recording medium as in claim 1, wherein the metal is selected from the group consisting of Mg, Sc, Y, Ti, Zr, Hf, V, Nb, Ta, Cr, Mo, W, Mn, Re, Fe, Co, Ni, Rh, Pd, Ir, Pt, Cu, Ag, Au, Zn, Cd, Al, Ga, In, Si, Ge, Sn, As, Sb, Bi, Se, and Te.

6. A recording medium as in claim 5, wherein the metal is In.

7. A recording medium as in claim 5, wherein the metal is In or Sn.

8. A recording medium as in claim 5, wherein the metal is selected from the group consisting of Mg, Zn, Al, In, Bi and Sn.

9. A recording medium as in claim 1, wherein the metal compound is $Ga_2S_3$.

10. A recording medium as in claim 1, wherein the metal compound is $MoO_3$.

11. A recording medium as in claim 1, wherein the proportion of the metal compound in the recording layer is from to 40% by volume.

* * * * *